United States Patent [19]
Cho

[11] Patent Number: 4,817,172
[45] Date of Patent: Mar. 28, 1989

[54] IMAGE PROCESSING SYSTEM

[75] Inventor: Kenjiro Cho, Tokyo, Japan

[73] Assignee: Canon Kabushiki Kaisha, Tokyo, Japan

[21] Appl. No.: 854,193

[22] Filed: Apr. 21, 1986

[30] Foreign Application Priority Data

Apr. 25, 1985 [JP] Japan .................. 60-87516

[51] Int. Cl.⁴ .............................. G06K 9/00
[52] U.S. Cl. ...................... 382/21; 340/730; 364/518; 382/55
[58] Field of Search .............. 382/21, 22, 60, 54, 382/55; 340/730, 731; 364/523, 518

[56] References Cited

U.S. PATENT DOCUMENTS

| | | | |
|---|---|---|---|
| Re. 30,679 | 7/1981 | Evans et al. | 364/523 |
| 4,087,788 | 5/1978 | Johannesson | 382/55 |
| 4,630,306 | 12/1986 | West et al. | 382/21 |

FOREIGN PATENT DOCUMENTS

137856 4/1985 European Pat. Off. .

*Primary Examiner*—Leo H. Boudreau
*Attorney, Agent, or Firm*—Fitzpatrick, Cella, Harper & Scinto

[57] ABSTRACT

An image processing system includes: a memory unit for storing an image in the form of vectors; a discrimination unit for fetching vector data representative of the image stored in the memory unit and discriminating the signs of a component of a normal vector of the vector data at a point constituting the contour of the image; and a moving unit for moving the point constituting the contour of the image on the basis of the discrimination result by the discrimination unit.

13 Claims, 3 Drawing Sheets

Fig. 6A    Fig. 6B
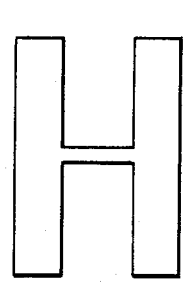
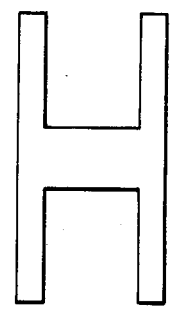
Fig. 7C
Fig. 7A   Fig. 7B
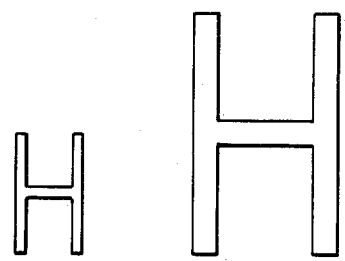
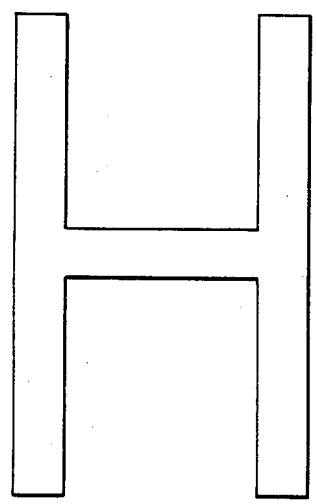

(1)

IMAGE PROCESSING SYSTEM

BACKGROUND OF THE INVENTION

1. Field of the Invention

The present invention relates to a method of transforming delineative patterns such as graphic characters, which method is used with a graphic pattern processing system employing vector data for processing the delineative patterns, and more particularly, to an image processing system in which contour line data, composed of vector data, of the delineative pattern is moved by discriminating the signs of the normal vector component of the contour line data so that the widths along the vertical and horizontal directions of the delineative pattern can be changed independently from each other.

2. Related Background Art

The method of processing graphic characters in the form of vector data is very advantageous in its high data compression rate and its high quality of displayed graphic patterns which have undergone one or more desired graphic pattern transformations, such as magnification, reduction and the like. However, with the conventional pattern transformation, when a character "H", as shown in FIG. 7A, for example, is subjected to proportional magnification, the resultant transformed characters are such as those shown in FIG. 7B and FIG. 7C. Thus, in case where a character is magnified or reduced in scale, the ratio of the width along the vertical direction to the width along the horizontal direction is constant and the relative width between both directions cannot be changed.

BRIEF DESCRIPTION OF THE DRAWINGS

FIGS. 6A and 6B show examples of graphic characters obtained according to the present invention; and FIGS. 7A, 7B and 7C show examples of graphic characters obtained according to the prior art.

SUMMARY OF THE INVENTION

In view of the above problems, it is an object of the present invention to provide an image processing system comprising discriminating means for discriminating the signs of a normal vector component of the contour line of a delineative pattern such as a picture image.

It is another object of the present invention to provide an image processing system capable of independently changing the widths of an image (pattern) along the vertical and horizontal directions and which, when applied to a character, can provide various patterned characters easy to read.

It is a further object of the present invention to provide an image processing system capable of changing the widths along the desired directions by performing a predetermined calculation of the component of a normal vector, taking its sign into consideration.

DETAILED DESCRIPTION OF THE EMBODIMENT

The embodiment of the present invention will now be described with reference to the accompanying drawings. In the image processing system of the present invention, the objects to be processed may include an image, graphic pattern, graphic character and the like. Obviously, the system may be constructed of a composite apparatus or a unitary apparatus.

Figure 1:
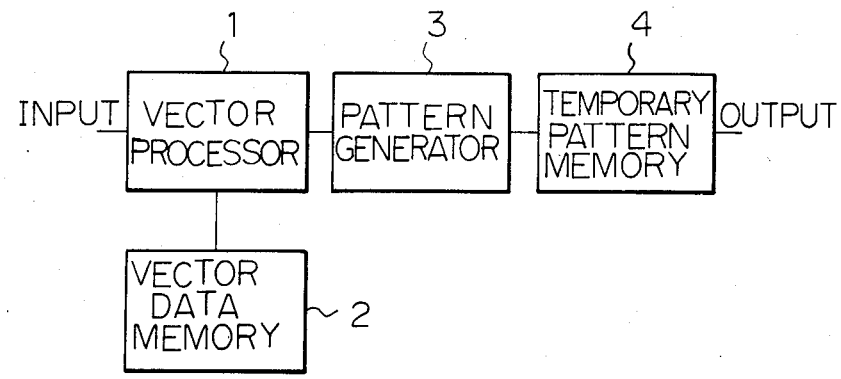
FIG. 1 is a block diagram illustrating an embodiment of the image processing system according to the present invention.

FIG. 1 is a block diagram showing the embodiment of the image processing apparatus of the present invention. In the Figure, reference numeral 1 represents a vector processor, reference numeral 2 represents a vector data memory, reference numeral 3 represents a pattern generator, and reference numeral 4 represents a temporary pattern memory.

Character (or image) data in the form of vector data is stored in the vector data memory 2. The vector processor 2 receives an execution command from an external circuit and reads necessary data from the vector data memory 2. The vector processor 2 processes the read-out vector data to obtain necessary data which in turn sent to the pattern generator 3. The pattern generator 3 develops the vector data as numerical data into an actual vector pattern and write it into the temporary pattern memory 4. The written pattern is then read out to an external circuit as a processed data output.

The contour of a graphic character is represented by a vector data point train shown by o symbols, linear line segments and or curved line segments being interposed between points.

The direction of each vector data, and hence the order of each point is arranged as shown by arrows so that the inside of the graphic pattern (inside of the contour) is always located to the right side relative to the direction of each vector data.

Figure 3:
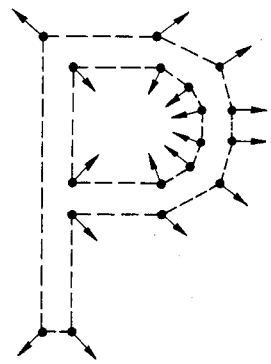
FIG. 3 shows normal vectors of the vector data of FIG. 2.

The normal vectors at respective points are shown in FIG. 3. As seen from FIG. 3, the normal vectors are directed to the outside of the contour, which results from the above-noted order of each point.

Figure 2:
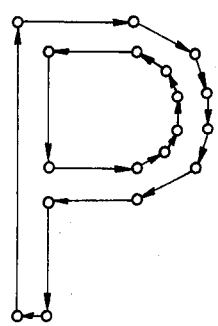
FIG. 2 is an example of vector data of the contour of graphic character "P"

To make broader only the width along the vertical direction of the pattern, only the sign of the x component of each normal vector is to be noticed and the point is moved by a predetermined amount in the direction of the x component of the normal vector. An example of the character thus processed by moving the points of FIG. 2 character is shown in FIG. 4.

Figure 4A:
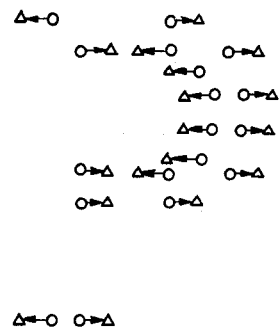
FIG. 4A illustrates the vertical width transformation of the graphic character of FIG. 2.
Figure 4B:
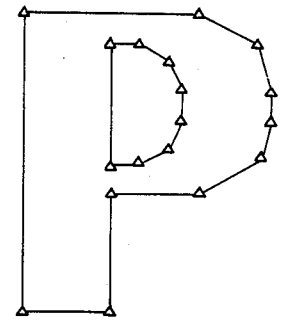
FIG. 4B shows vector data of the graphic character after undergoing the transformation of FIG. 4A.

In FIG. 4A illustrating the process of making broader the width, o symbols represent the points before the process while Δ symbols represent the points after the process. FIG. 4B shows the contour of the character thus obtained. Alternatively, to make narrow the width along the vertical direction of the pattern, the point is moved in the direction opposite to that of the x component of the normal vector. Similarly, as to the width along the horizontal direction of the pattern, only the signs of the y component of the normal vector is taken into consideration for widening or narrowing the width.

With the above processes, it is possible to independently make broader or narrower the widths along the vertical and horizontal directions of the contour of a graphic character. It is noted that the direction of movement of the point train of the vector data depends only upon the signs of the x and y components of the normal vectors. Therefore, it is not necessary to use a precise normal vector for each point, but an approximate value can be employed using a simplified algorithm.

Figure 5:
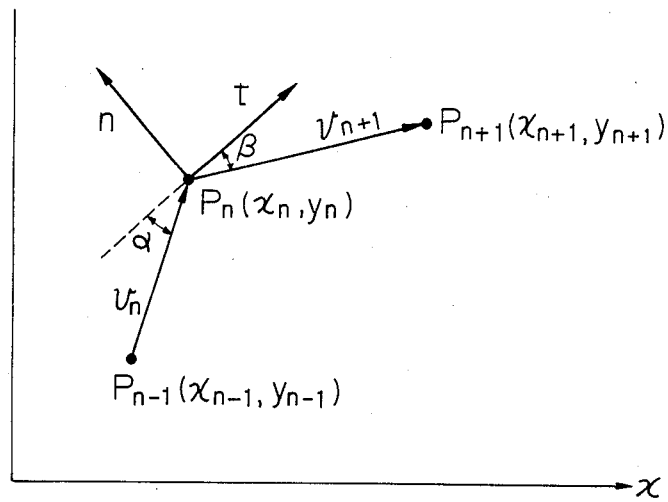
FIG. 5 illustrates an approximate solution of normal vectors according to the present invention.

An approximate solution of a normal vector applied to the present embodiment will be described with reference to FIG. 5. FIG. 5 shows vector data point train $P_{n-1}(x_{n-1}, y_{n-1})$, $P_n(x_n, y_n)$ and $P_{n+1}(x_{n+1}, y+1)$, and vectors $V_n$ and $V_{n+1}$ interconnecting the points.

The relation between each points and vectors $V_n$ and $V_{n+1}$ can be expressed in the following equations:

$$V_n = (x_n - x_{n-1}, y_n - y_{n-1})$$

$$V_{n+1} = (x_{n+1} - x_n, y_{n+1} - y_n) \quad (1)$$

Assuming here that tangent vector $t_1$ is defined as having the same angle $\alpha$ and $\beta$, tangent vector $t_1$ can be expressed in the following equation because the half of the angle between vectors $V_{n+1}$ and $V_n$ are obtained by adding the unit vectors thereof:

$$t_1 = (V_{n+1}/|V_{n+1}|) + (V_n/|V_n|) \quad (2)$$

Normal vector (unit vector n perpendicular to tangent vector $t(t_x, t_y)$ and directing to the left side relative to the direction of vectors, is given by:

$$n = (t_y, t_x) \quad (3)$$

Therefore, from the equations (1), (2) and (3):

$$n = \{-|V_n| \cdot (y_{n+1} - y_n) - |\cdot(y_n - y_{n-1}),$$
$$|V_n| \cdot (x_{n+1} x_n) + |V_{n+1}| \cdot (x_n - x_{n-1})\}$$

where $$|V_n| = \sqrt{(x_n - x_{n-1})^2 + (y_n - y_{n-1})^2}$$

$$|V_{n+1}| = \sqrt{(x_{n+1} - x_n)^2 + (y_{n+1} - y_n)^2}$$

$$t = t_1/(|V_n| \cdot |V_{n+1}|)$$

The approximate normal vector can be solved as above. In this case, if the width only along the vertical direction of the pattern is processed, the y component of the normal vector is not needed, or vice versa.

After the graphic character is subjected to the above widening or narrowing process, transformation such as magnification, reduction or rotation is carried out. Examples of such transformation applied to the character shown in FIG. 7A are shown in FIGS. 6A and 6B, wherein the magnified character with broadened width along the vertical direction is shown in FIG. 6A, and the magnified character with narrowed width along the horizontal direction is shown in FIG. 6B.

As seen from the foregoing description of the present invention, it is possible to independently changing the widths along the vertical and horizontal directions of a delineative pattern (e.g., graphic pattern) by discriminating the signs of the normal vector and moving the contour line data. Further, application of the present invention to characters enables various patterned characters easy to read.

What is claimed is:

1. An image processing system comprising:
   memory means for storing an image in the form of vectors;
   discrimination means for reading vector data representative of the image stored in said memory means and discriminating, on the basis of a point train comprising a plurality of points indicated by said vector data, a respective direction in which each of the plurality of points is to be moved relative to at least one other of the points, the plurality of points comprising the contour of said image;
   moving means for moving one or more of the plurality of points on the basis of a result of discrimination performed by said discrimination means; and
   dot data memory means for storing the points moved by said moving means as dot data.

2. An image processing system according to claim 1, wherein said discrimination means discriminates the direction on the basis of a normal vector component obtained by the point train.

3. An image processing system comprising:
   memory means for storing image information;
   calculation means for reading said image information stored in said memory means and calculating a respective normal vector at each point of vector information comprising a coordinate data point train;
   moving means for obtaining a respective sign of each of said normal vectors and moving said coordinate point train in a direction determined on the basis of said signs;
   interpolating means for interpolating said coordinate point train moved by said moving means with a segment selected from the group consisting of a linear line segment and a curved line segment; and
   output means for outputting said image information interpolated by said interpolation means as a contour line.

4. An image processing system according to claim 3, wherein said moving means determines each sign on the basis of a component of the corresponding normal vector, and wherein said component is selected from the group consisting of an x component and a y component of said corresponding normal vector.

5. An image processing system comprising:
   input means for inputting image information as contour information represented by a coordinate data point train;
   moving means for moving said point train representative of said contour information input by said input means in a direction in order to modify said image information by one of: (1) thickening an image represented by said image formation and (2) thinning the image;
   interpolation means for interpolating said coordinate data point train with a linear line or a curved line;
   transformation means for performing a transformation of said image information; and
   output means for outputting said image information processed by said moving means, said interpolation means and said transformation means.

6. An image processing system according to claim 5, wherein direction is a direction of a predetermined component of a normal vector of said contour information.

7. An image processing system according to claim 1, wherein the dot data stored in said dot data memory means is different from data which would be obtained by representing said vector data in its original form by dots.

8. An image processing system according to claim 1, wherein said discriminattion means discriminates whether each of the points goes in a + sense or in a − sense of the discriminated direction.

9. An image processing system according to claim 2, wherein said component is selected from the group consisting of an x component and a y component of said normal vector.

10. An image processing according to claim 1, further comprising means for interpolating areas between points represented by the dot data stored in said dot data memory means.

11. An image processing system according to claim 1, wherein said dot data memory means stores patterns obtained by representing the image by dots, wherein the image includes an image portion having a width, and wherein each of the patterns stored in said dot data memory means has a portion corresponding to said image portion and having a width different from said width of said image portion.

12. An image processing system according to claim 5, further comprising means for deciding whether the moving action performed by said moving means should be in a + sense or a − sense of the direction the point train is moved by said moving means.

13. An image processing system according to claim 5, wherein said transformation means includes means for performing at least one of (1) magnification, and (2) rotation of said image information.

* * * * *

UNITED STATES PATENT AND TRADEMARK OFFICE
CERTIFICATE OF CORRECTION

PATENT NO. : 4,817,172
DATED : March 28, 1989
INVENTOR(S) : KENJIRO CHO

Page 1 of 3

It is certified that error appears in the above-identified patent and that said Letters Patent is hereby corrected as shown below:

IN [56] REFERENCES CITED

U.S. PATENT DOCUMENTS, --4,654,651 3/1987 Kishi et al.-- should be inserted.

COLUMN 1

Line 28, "in case" should read --in a case--.

COLUMN 2

Line 4, "EMBODIMENT" should read --PREFERRED EMBODIMENT--.
    Line 6, "embodiment" should read --preferred embodiment--.
    Line 22, "cessor 2" should read --cessor 1--.
    Line 24, "vector processor 2" should read --vector processor 1--.
    Line 26, "sent" should read --is sent--.
    Line 28, "write" should read --writes--.
    Line 33, "and or" should read --and/or--.
    Line 36, "point" should read --point,--.
    Line 60, "is" should read --are--.

UNITED STATES PATENT AND TRADEMARK OFFICE
CERTIFICATE OF CORRECTION

PATENT NO. : 4,817,172
DATED : March 28, 1989
INVENTOR(S) : KENJIRO CHO

It is certified that error appears in the above-identified patent and that said Letters Patent is hereby corrected as shown below:

COLUMN 3

Line 8, "$P_{n+1}(x_{n+1}, y+1),$" should read --$P_{n+1}(x_{n+1}, Y_{n+1}),$--.
Line 10, "each" should read --the--.
Line 19, "are" should read --is--.
Line 24, "(unit vector n" should read --(unit vector)n--.
Line 28, "$n=(t_y, t_x)$ (3)" should read --$n=(-t_y, t_x)$ (3)--.
Lines 31-32, "$n=\{-|V_n|\cdot(Y_{n+1}-Y_n)-|\cdot(Y_n-Y_{n-1}),$
$|V_n|\cdot(x_{n+1}x_n)+|V_{n+1}|\cdot(x_n-x_{n-1})\}$"
should read --$n=\{-|V_n|\cdot(Y_{n+1}-Y_n)-|V_{n+1}|\cdot(Y_n-Y_{n-1}),$
$|V_n|\cdot(x_{n+1}-x_n)+|V_{n+1}|\cdot(x_n-x_{n-1})\}$--.
Line 44, "or" should read --and--.
Line 48, "transformation" should read --transformations--.
Line 55, "independently changing" should read --change independently--.

COLUMN 4

Line 48, "image formation" should read --image information--.
Line 58, "wherein direction" should read --wherein said direction--.
Line 68, "discriminattion" should read --discrimination--.

UNITED STATES PATENT AND TRADEMARK OFFICE
CERTIFICATE OF CORRECTION

PATENT NO. : 4,817,172
DATED : March 28, 1989
INVENTOR(S) : KENJIRO CHO

Page 3 of 3

It is certified that error appears in the above-identified patent and that said Letters Patent is hereby corrected as shown below:

COLUMN 5

Line 7, "image processing" should read --image processing means--.
Line 9, "points" should read --the points--.

Signed and Sealed this

Tenth Day of April, 1990

Attest:

HARRY F. MANBECK, JR.

*Attesting Officer*   *Commissioner of Patents and Trademarks*